(12) United States Patent
Patel et al.

(10) Patent No.: US 7,660,565 B2
(45) Date of Patent: Feb. 9, 2010

(54) WIRELESS SIGNAL STRENGTH NOTIFICATION SYSTEM AND METHOD

(75) Inventors: Mehul B. Patel, Bangalore (IN); Subramanya Ravikanth Uppala, Bangalore (IN)

(73) Assignee: Kyocera Corporation, Kyoto (JP)

( * ) Notice: Subject to any disclaimer, the term of this patent is extended or adjusted under 35 U.S.C. 154(b) by 459 days.

(21) Appl. No.: 11/464,468

(22) Filed: Aug. 14, 2006

(65) Prior Publication Data

US 2008/0039040 A1    Feb. 14, 2008

(51) Int. Cl.
*H04B 17/00* (2006.01)
*H04B 17/02* (2006.01)

(52) U.S. Cl. .................... 455/132; 455/67.11; 455/134; 455/226.2; 455/436; 370/332

(58) Field of Classification Search ... 455/552.1–553.1, 455/67.11–67.7, 226.1–226.4, 132–135, 455/436–437; 370/331–332
See application file for complete search history.

(56) References Cited

U.S. PATENT DOCUMENTS

| | | | |
|---|---|---|---|
| 5,790,940 A | * | 8/1998 | Laborde et al. ............... 455/69 |
| 6,829,481 B2 | | 12/2004 | Souissi |
| 6,944,144 B2 | | 9/2005 | Guo et al. |
| 2004/0218575 A1 | | 11/2004 | Ibe et al. |
| 2005/0260968 A1 | * | 11/2005 | Ito et al. ..................... 455/337 |
| 2006/0121894 A1 | * | 6/2006 | Ganesan .................. 455/432.1 |
| 2006/0205371 A1 | * | 9/2006 | Kitani et al. ............. 455/226.2 |
| 2007/0066228 A1 | * | 3/2007 | Leinonen et al. ......... 455/67.11 |

* cited by examiner

*Primary Examiner*—Simon D Nguyen

(57) ABSTRACT

A dual or multi-mode wireless communication device has a first microprocessor for a first type of wireless signal, such as an IEEE 802.11 ("WiFi") signal, and a second microprocessor for a second type of wireless signal, such as a cellular network signal. The received signal strength of the first type of wireless signal is monitored by the first microprocessor when the communication device is operating in a first wireless mode, and a notification message is sent from the first microprocessor to the second microprocessor whenever the received signal strength is determined to have changed from one level to another level. The second microprocessor then updates a received signal strength indicator ("RSSI") icon on the screen of the wireless device to indicate the new received signal strength level.

22 Claims, 2 Drawing Sheets

WIRELESS SIGNAL STRENGTH NOTIFICATION SYSTEM AND METHOD

TECHNICAL FIELD

The present invention relates generally to portable communication devices such as mobile phones, personal digital assistants, and the like, and is particularly concerned with a system and method for received signal strength notification in a dual or multi-mode wireless communication device, such as an IEEE 802.11 ("WiFi") enabled cellular phone or other portable wireless communication device.

BACKGROUND

In mobile phones, the strength of the received signal strength indicator ("RSSI") is displayed to the user on the screen. The display is normally in the form of an RSSI icon. The RSSI icon is modified whenever the received signal changes in level, for example when it rises or falls beyond predefined levels. This may be done by changing the number of bars or height of a bar in the RSSI icon.

A dual mode or WiFi enabled phone has two microprocessors, one for the cellular network which may be a code division multiple access ("CDMA"), frequency division multiple access ("FDMA"), or time division multiple access ("TDMA") processor, for example, and the other for the wireless local area network ("WLAN"). A dual mode cellular and WiFi phone, for example a CDMA+WiFi phone, needs to display the RSSI icon based on the access technology which is in use by the user at the moment. If the phone is using a cellular phone technology such as CDMA, TDMA, or the like, i.e. the user is making or receiving telephone calls over a cellular data network, the CDMA microprocessor displays the signal strength received from the cellular base station. If the phone is using another wireless network, such as a wireless local area network or WiFi network, either to send or receive data or to make or receive calls over the WiFi network, the screen must display the signal strength received from the associated access point of the wireless network.

In a typical system, the cellular or CDMA microprocessor monitors and processes the received signal strength of the cellular base station, while the WiFi microprocessor monitors the received signal strength of the associated access point. However, since the display of the RSSI icon is controlled by the cellular microprocessor, it must obtain the WiFi received signal strength from the WiFi microprocessor. The cellular microprocessor therefore queries the received signal strength of the WiFi signal periodically, using the interface between the two microprocessors. If the signal strength reduces below a certain threshold, the cellular or CDMA microprocessor performs certain actions related to seamless mobility, and also uses this information to update the RSSI icon.

The CDMA and WiFi microprocessors communicate with each other using messages. A timer in the CDMA microprocessor is used to determine the time interval between signal strength queries being sent to the WiFi microprocessor. On receipt of the query, the WiFi microprocessor calculates the RSSI and prepares a response message, which is then sent from the WiFi microprocessor to the CDMA microprocessor. If there has been any change in the WiFi received signal strength since the previous RSSI response message, the RSSI icon is updated to reflect the current received signal strength, and the CDMA microprocessor performs other actions if required for seamless mobility, for example if the received signal strength has fallen below a threshold.

In this system, the CDMA microprocessor has to send requests to the WiFi microprocessor periodically to receive the current WiFi received signal strength. This requires a relatively large number of messages back and forth between the two processors, reducing battery life. It also places an extra burden on the WiFi processor, which must send a current RSSI message to the CDMA microprocessor every time a query is received, regardless of whether the signal strength has changed.

Therefore, what is needed is a system and method that reduces the number of back and forth messages required for the cellular microprocessor to update the RSSI icon when the phone is operating in the WiFi mode.

SUMMARY

An improved WiFi signal strength notification system and method for use in a mobile communication device are disclosed. An exemplary method for monitoring signal strengths in a multi-mode wireless communication device comprises monitoring the signal strengths of a first type of wireless signal received by a first microprocessor in a first wireless access mode, and determining if the received signal strength at the first microprocessor falls outside a predetermined threshold. In this embodiment, the first microprocessor notifies the second microprocessor when the received signal strength at the first microprocessor falls outside the predetermined threshold.

In an exemplary embodiment, the first microprocessor monitors the signal strength of the first type of wireless signal when the device is operating in the first wireless access mode, and the second microprocessor monitors the signal strength of a second type of wireless signal when the device is operating in a second wireless access mode. The signals may be any type of wireless communication signals. In one embodiment, the first type of wireless signal is an IEEE 802.11 ("WiFi") signal and the second type of wireless signal is a cellular phone signal. In this case, the first microprocessor is a WiFi microprocessor and the second microprocessor is a cellular signal microprocessor such as a CDMA microprocessor.

The method may further comprise the step of configuring the first microprocessor to define at least a first and a second signal strength range associated with the first microprocessor, and the step of determining if the received signal strength is outside the predetermined threshold comprises using the first microprocessor to determine when the received signal strength transitions from one signal strength range to another signal strength range and notifying the second microprocessor when such a transition occurs, by sending a notification message containing the new signal strength range.

This method reduces the number of communications between the first and second microprocessors, since a message is sent from the first microprocessor to the second microprocessor only if the received first type of wireless signal strength transitions between two ranges. Unnecessary periodic messages back and forth between the two microprocessors can thus be avoided. The second microprocessor will update a signal strength indicator on the screen of the wireless communication device with the new signal strength whenever it receives a message from the first microprocessor, and will take other necessary action if the signal falls below a predetermined threshold.

In the case where the first microprocessor is a WiFi processor, the WiFi microprocessor will automatically monitor the WiFi signal strength on a periodic basis. However, notifications are not sent to the second microprocessor unless the WiFi microprocessor determines that the received signal strength is no longer within one signal strength range and has moved into the other signal strength range. The second microprocessor does not need to send queries to the WiFi microprocessor, but is automatically notified whenever the signal strength transitions between two different ranges.

This method will reduce the number of messages between the two microprocessors and does not place any extra burden on the WiFi microprocessor, since it is already set up to monitor received signal strength on a periodic basis. The method will therefore increase battery life.

In an exemplary embodiment, the first microprocessor may be configured with a series of signal strength ranges which may be of equal or unequal size, and the first microprocessor will send a signal strength message to the second microprocessor whenever the signal strength transitions from one range to a different range.

According to one embodiment, a wireless communication system is provided, which comprises a first microprocessor for receiving and transmitting a first type of wireless signal, the first microprocessor being configured to periodically monitor the strength of the received first wireless signal when the device is in a first wireless mode, a second microprocessor for receiving and transmitting a second type of wireless signal, the second microprocessor being configured to periodically monitor the strength of the received second wireless signal when the device is operating in a second wireless mode, a communication interface between the first and second microprocessors, the first microprocessor further comprising notification means for notifying the second microprocessor when the strength of the first wireless signal passes a threshold.

In an exemplary embodiment, the first microprocessor is configured with at least two signal strength ranges, and the notification means comprises means for notifying the second microprocessor when the strength of the received first wireless signal changes from one signal strength range to the other signal strength range. The first microprocessor may be configured with a plurality of signal strength ranges of equal or unequal size, and is configured to notify the second microprocessor whenever a transition is made from one signal strength range to another.

Other features and advantages of the present invention will become more readily apparent to those of ordinary skill in the art after reviewing the following detailed description and accompanying drawing.

BRIEF DESCRIPTION OF THE DRAWING

The details of the present invention, both as to its structure and operation, may be gleaned in part by study of the accompanying drawings, in which like reference numerals refer to like parts.

DETAILED DESCRIPTION

Figure 1:
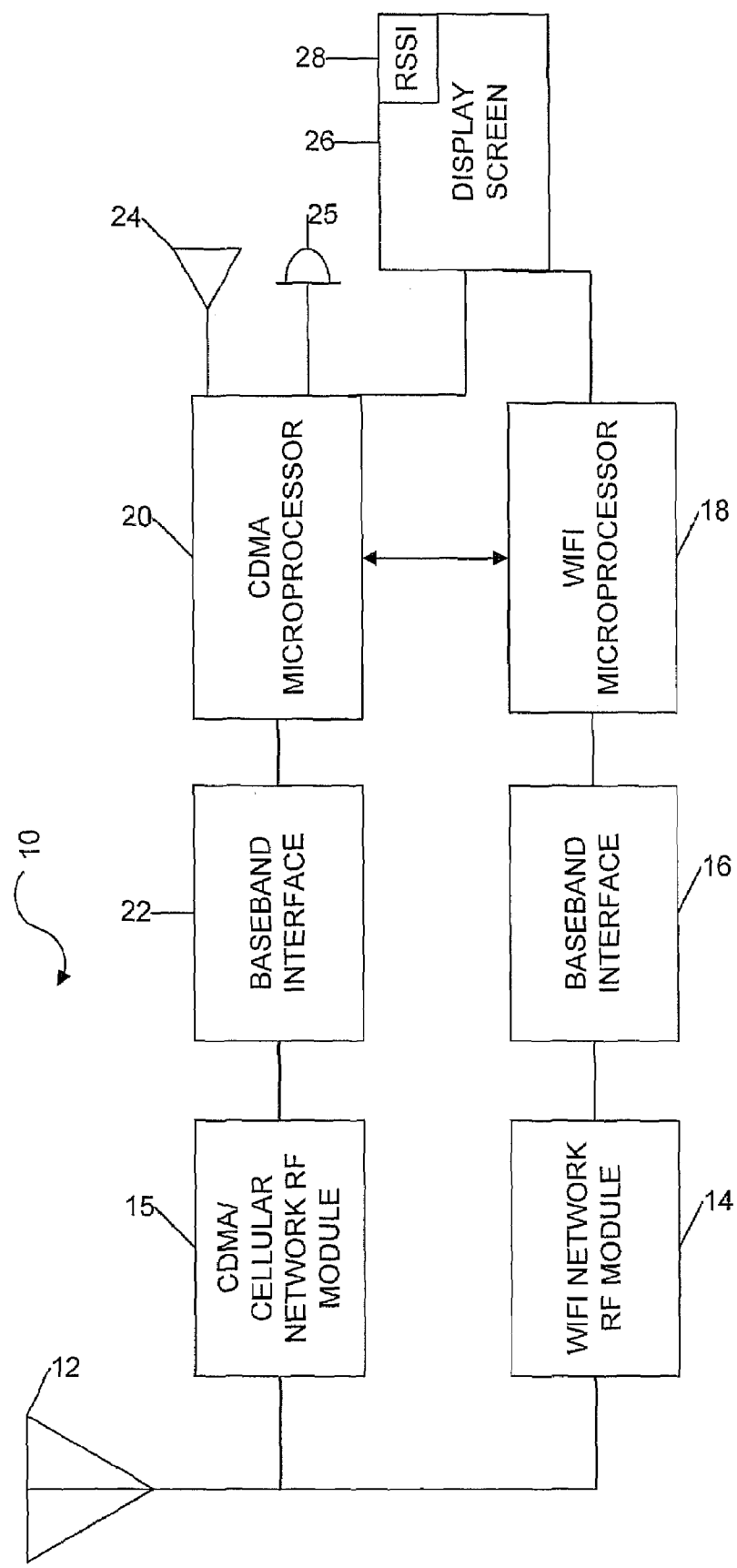
FIG. 1 is a block diagram of a dual mode wireless communication device according to an embodiment of the invention.

FIG. 1 is a block diagram illustrating the components of an exemplary dual mode wireless communication device 10 that may be used in connection with the signal strength notification method of this invention. The wireless communication device 10 may be a mobile phone, personal digital assistant ("PDA") or other mobile wireless communication device, for example. However, other wireless communication devices and/or architectures may also be used, as will be clear to those skilled in the art, and the device may be a multi-mode wireless device capable of operating in more than two different wireless modes.

In the illustrated embodiment, wireless communication device 10 comprises an antenna system 12 linked to a first radio or radio frequency ("RF") module 14 for receiving and transmitting signals over wireless network such as an IEEE 802.11 ("WiFi") network and a second radio or RF module 15 for receiving and transmitting signals over a cellular data network. These modules may be combined in a single module with appropriate switching circuitry in alternative embodiments. In the wireless communication device 10, signals are transmitted and received over the air by the antenna system 12 under the management of the radio module or modules 14, 15. The antenna system 12 may comprise a single antenna with sections for receiving the different frequency signals from the different networks covered, or may comprise separate WiFi and cellular antennae.

The first or WiFi radio module 14 is connected to a baseband interface 16, and interface 16 is connected to WiFi microprocessor 18. The second or cellular radio module 15 is connected to a cellular microprocessor 20 via baseband interface 22. The baseband interfaces 16 and 22 may be combined in a single unit. Cellular microprocessor 20 may be a CDMA microprocessor when the mobile device uses CDMA technology. Each baseband interface converts baseband signals received from the associated radio module to digital signals sent to the associated microprocessor, and converts digital signals from the associated processor into baseband signals to send to the radio module for transmission from the antenna to an associated base station in the cellular network or an associated access point in the WiFi network.

The CDMA microprocessor is connected to a speaker 24 and a microphone 25 via input/output (I/O) interfaces (not shown). Both microprocessors are connected to a display screen 26 of the wireless device via an I/O interface for display of received data and various other information, such as received signal strength or RSSI, which is typically displayed by means of an RSSI icon 28. The WiFi microprocessor may also be connected to the microphone and speaker where the device is configured to receive and transmit voice calls over a wireless data network e.g., voice over internet protocol ("VoIP") technology.

The hardware, software, function and operation of a dual mode wireless communication device is known in the field and will therefore not be described in any more detail. Instead, the following description is concerned with the modification of such a device to implement the received signal strength notification system and method according to the exemplary embodiment of this invention, as illustrated in FIG. 2.

Figure 2:
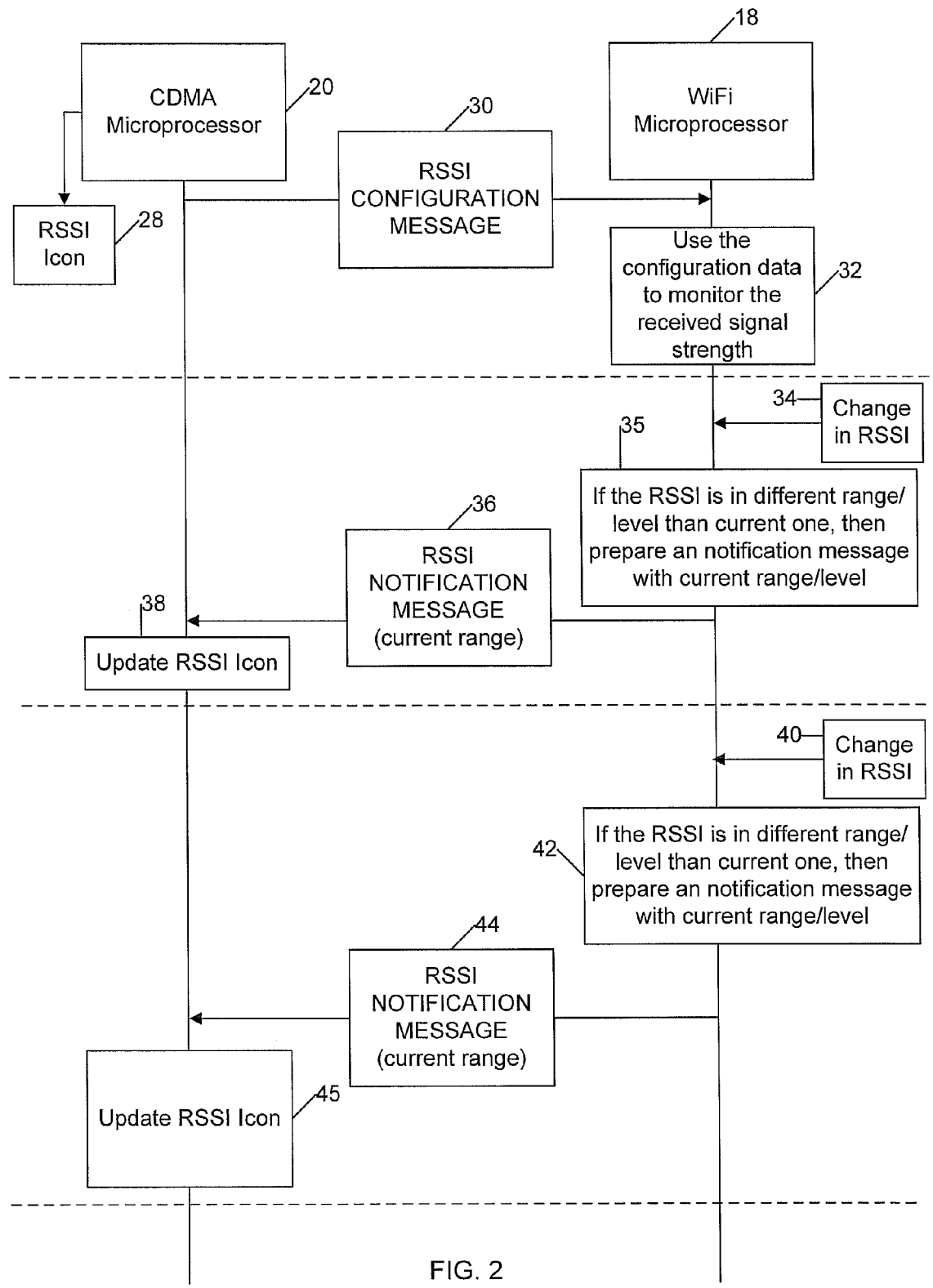
FIG. 2 is a flow diagram of a signal strength notification method and system which may be incorporated in the wireless communication device of FIG. 1 according to an exemplary embodiment of the invention.

FIG. 2 illustrates a method and system for received signal strength notification in a dual mode, mobile wireless communication device 10 as illustrated in FIG. 1, such as a mobile phone, or personal digital assistant ("PDA"), or portable computer, for example. As noted above, the dual mode communication device has a first microprocessor 18 for receiving and processing a first wireless signal, such as a WiFi signal, and a second microprocessor 20 for receiving and processing a second wireless signal, such as a wireless network or cellular signal. In the exemplary embodiment, the first microprocessor is a WiFi microprocessor and the second microprocessor is a CDMA microprocessor, but the second microprocessor may be any type of microprocessor for processing wireless communication signals, such as TDMA, FDMA, or the like.

In the exemplary embodiment the CDMA microprocessor and WiFi microprocessor carry out the steps indicated in FIG. 2. The CDMA microprocessor 20 is programmed to send an RSSI configuration message 30 to the WiFi microprocessor 18 in the initial set up of the system. This configuration message may comprise a series of signal strength ranges. If the signal strength ranges are of equal size, the configuration message will comprise the number of different signal strength ranges to be used (for example, n range), and the type of configuration (equal). The WiFi microprocessor 18 will then calculate n equal size signal strength ranges, as follows:

Range 1 from MAX to S1
Range 2 from S1 to S2
Range 3 from S2 to S3
...
Range n from S(n−1) to zero.

where S is the signal strength in dB. The configuration range data is stored in the data storage area of the WiFi microprocessor and used to monitor the WiFi signal strength received by the WiFi microprocessor.

If the sizes of the successive signal strength ranges are selected to be unequal, the configuration message 30 sent by the CDMA microprocessor will indicate that the type of configuration is unequal, and will also indicate the number of different ranges (e.g., n), and will list the start and end signal strength for each signal strength range to be monitored, i.e. MAX to S1, S1 to S2, S2 to S3 ... and S(n−1) to 0. At step 32, the configuration data is stored by the WiFi microprocessor and used to monitor the received WiFi signal strength.

When the phone or other wireless device is in the CDMA or cellular mode, it will receive signals from the local CDMA base station and the CDMA microprocessor will control the RSSI icon 28 to display the current CDMA or cellular signal strength. When the phone is using WiFi, it displays the signal strength of the signal received from the associated access point of the WiFi network.

At step 34, when the WiFi microprocessor detects a change in the received signal strength of the WiFi signal, it will determine whether or not the RSSI has moved into a different signal strength range or level in accordance with the RSSI configuration message 30. At step 35, if the RSSI has moved into a different range, the WiFi microprocessor will prepare a notification message containing the current RSSI range or level. This message is then transmitted to the CDMA microprocessor via RSSI notification message 36, and the CDMA microprocessor will update the RSSI icon 28 to indicated the current WiFi signal strength at step 38.

The WiFi microprocessor continues to monitor the received WiFi signal strength at predetermined intervals while the device is operating in the WiFi mode, and when another change in signal strength is detected at step 40, it will again determine whether the new signal strength is in a different range from the previous signal strength. If the signal strength is in a new range, another notification message will be prepared with the current range/level of the WiFi signal at step 42. This message is transmitted to the CDMA microprocessor at step 44, which will again update the RSSI icon at step 45. The process will continue as indicated in FIG. 2 while the phone or wireless device operates in the WiFi mode. If the CDMA microprocessor determines that the received signal strength of the associated access point is below a certain threshold, the microprocessor will carry out actions related to seamless mobility, as will be understood by one skilled in the art.

This system significantly reduces the number of messages back and forth between a cellular signal microprocessor and a WiFi microprocessor in a dual mode wireless communication device. As discussed above, existing solution require the CDMA microprocessor to query the WiFi microprocessor at periodic intervals, and the WiFi microprocessor to send the current WiFi signal strength each time a query is received, regardless of whether there has been any change in signal strength. In contrast, the system and method described in conjunction with FIGS. 1 and 2 do not require the same query and reply messaging technique. Instead, messages are sent from the WiFi microprocessor to the CDMA microprocessor when the received WiFi signal strength moves out of one pre-selected range and into another pre-selected range. Thus, small changes in RSSI do not require any notifications being sent. In some embodiments, the ranges can be selected according to the scale of the RSSI icon. In other words, transitions from one range to another will correspond to the signal strength at which the CDMA microprocessor would normally change the number of bars or size of an RSSI icon on the screen.

This system and method described in conjunction with FIGS. 1 and 2 also significantly reduce the processing burden on the WiFi microprocessor, since it will only have to do a simple check to determine the range in which the current RSSI falls each time it does a standard signal strength check. Although the cellular technology described in the exemplary embodiment above is CDMA, the same method may be used for other types of mobile devices using TDMA or FDMA technology.

Those of skill in the art will appreciate that the various illustrative logical blocks, modules, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, or any other form of storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiment is provided to enable any person skilled in the art to make or use the invention. Various modifications to the exemplary embodiment described above and illustrated in the accompanying drawings will be readily apparent to those skilled in the art, and the generic principles described herein can be applied to other embodiments without departing from the spirit or scope of the invention. Thus, it is to be understood that the description and drawings presented herein represent an exemplary embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for monitoring signal strengths in a multimode wireless communication device having a first microprocessor and a second microprocessor, comprising:
   receiving at the first microprocessor a received signal strength indicator ("RSSI") configuration message comprising a number (n) of different signal strength ranges to be configured and a configuration type;
   configuring the first microprocessor to define at least two signal strength ranges in response to the RSSI configuration message;
   monitoring a received signal strength of wireless signal received by the first microprocessor when the communication device is operating in a first wireless mode;
   determining that the received signal strength has transitioned from a first signal strength range to a second signal strength range of the at least two signal strength ranges;
   preparing a notification message to the second microprocessor in response to the determined transition, the notification message comprising the second signal strength range; and
   sending the notification message from the first microprocessor to the second microprocessor.

2. The method of claim 1, wherein the configuration type in the RSSI configuration message is equal, and the step of configuring the first microprocessor further comprises calculating n signal strength ranges of equal size in the first microprocessor and storing the calculated n signal strength ranges for use by the first microprocessor in monitoring the received signal strength and determining if the received signal strength has transitioned from one range to another range.

3. The method of claim 1, wherein the type of configuration in the configuration message is unequal and the configuration message contains n successive signal strength ranges from zero to a maximum signal strength, the configuring step further comprising storing the signal strength ranges in memory associated with the first microprocessor for use by the first microprocessor in monitoring the received signal strength and determining if the received signal strength has transitioned from one range to another range.

4. The method of claim 1, wherein the monitored received signal strength is for an IEEE 802.11 ("WiFi") wireless signal.

5. The method of claim 1, further comprising monitoring the received signal strength of a wireless signal received by the second microprocessor when the device is operating in a second wireless mode.

6. The method of claim 5, wherein the monitored received signal strength of the wireless signal received by the second microprocessor is for a cellular network signal.

7. The method of claim 1, further comprising updating a received signal strength indicator ("RSSI") icon in the display of the wireless communication device to display the current received signal strength level.

8. A computer readable medium having stored thereon one or more sequences of instructions for causing one or more microprocessors to perform steps for signal strength notification in a dual mode wireless communication device, the steps comprising:
   receiving at a first microprocessor a received signal strength indicator ("RSSI") configuration message comprising a number (n) of different signal strength ranges to be configured and a configuration type;
   configuring the first microprocessor to define at least two signal strength ranges in response to the RSSI configuration message;
   monitoring a received signal strength of a wireless signal received by the first microprocessor when the communication device is operating in a first wireless mode;
   determining that the received signal strength has transitioned from a first signal strength range to a second signal strength range of the at least two signal strength ranges;
   preparing a notification message to the second microprocessor in response to the determined transition, the notification message comprising the second signal strength range; and
   sending the notification message from the first microprocessor to the second microprocessor.

9. The computer readable medium of claim 8, wherein the configuration type in the RSSI configuration message is equal and the step of configuring the first microprocessor further comprises calculating n signal strength ranges of equal size for use by the first microprocessor in monitoring the received signal strength and determining if the received signal strength has transitioned from one range to another range.

10. The computer readable medium of claim 8, wherein the configuration type in the RSSI configuration message is unequal and the configuration message contains n successive signal strength ranges for use by the first microprocessor in monitoring the received signal strength and determining if the received signal strength has transitioned from one range to another range.

11. The computer readable medium of claim 8, wherein the monitored received signal strength is for an IEEE 802.11 ("WiFi") wireless signal.

12. The computer readable medium of claim 8, wherein the processor is further configured to perform steps comprising monitoring the received signal strength of a wireless signal received by the second microprocessor when the device is operating in a second wireless mode.

13. The computer readable medium of claim 12, wherein the monitored received signal strength of the wireless signal received by the second microprocessor is for a cellular network signal.

14. The computer readable medium of claim 8, wherein the processor is further configured to perform steps comprising updating a received signal strength indicator ("RSSI") icon in the display of the wireless communication device to display the current received signal strength level.

15. A dual mode wireless communication device, comprising:
- a first microprocessor for receiving and transmitting a first type of wireless signal in a first mode of operation, the first microprocessor being configured to receive a signal strength indicator ("RSSI") configuration message comprising a configuration type and a number (n) of different signal strength ranges to be configured and to configure at least two signal strength ranges;
- a second microprocessor for receiving and transmitting a second type of wireless signal in a second mode of operation; and
- an interface between the first and second microprocessors;
- the first microprocessor further configured to send a current received signal strength indicator ("RSSI") notification message to the second microprocessor when the strength of the first wireless signal passes a threshold.

16. The device of claim 15, wherein the at least two configured signal strength ranges are successive.

17. The device of claim 15, wherein the at least two configured signal strength ranges are equal in size.

18. The device of claim 15, wherein the at least two configured signal strength ranges are unequal in size.

19. The device of claim 15, wherein the first microprocessor includes data storage containing the signal strength ranges, and the first microprocessor is programmed to compare the stored signal strength ranges with a current received wireless signal strength and to determine if the current received wireless signal strength is in a different range from a previous received wireless signal strength.

20. The device of claim 19, wherein the first microprocessor is programmed to send an RSSI notification message to the second microprocessor whenever the current received wireless signal strength moves from a first signal strength range into a second signal strength range.

21. The device of claim 15, wherein the first microprocessor is a WiFi microprocessor and the second microprocessor is a cellular data microprocessor.

22. The device of claim 15, wherein, the second microprocessor determines the at least two signal strength ranges configured by the first microprocessor.

* * * * *